April 11, 1961 D. L. REED 2,978,808
THONG CUTTING DEVICE
Filed Dec. 15, 1958
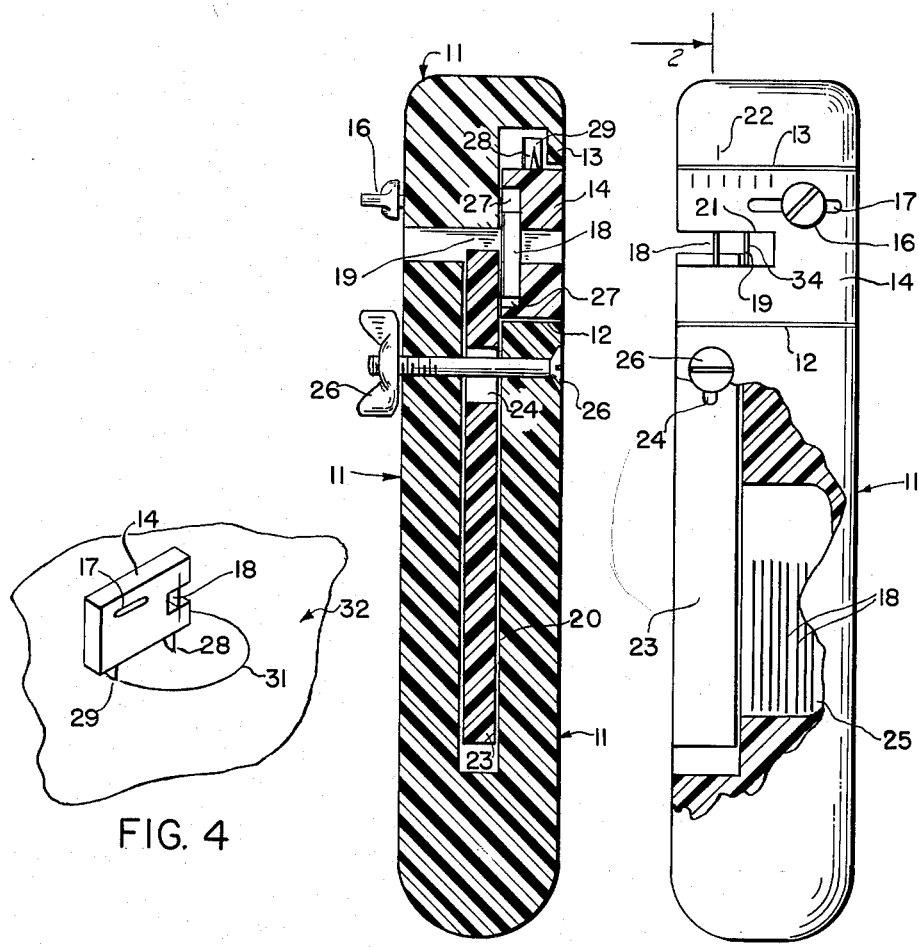
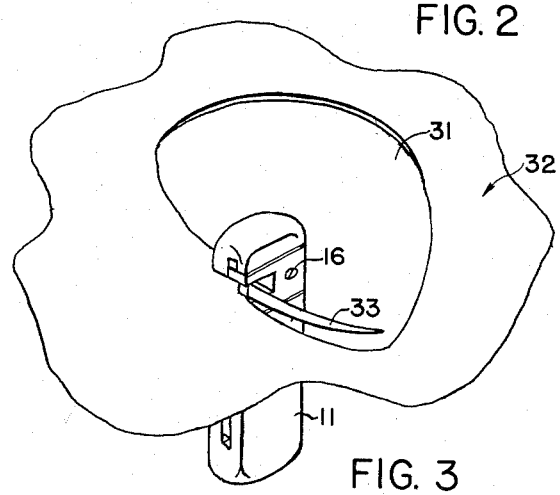
FIG. 3
INVENTOR.
DENNY L. REED
BY
ATTORNEY United States Patent Office 2,978,808
Patented Apr. 11, 1961

2,978,808
THONG CUTTING DEVICE
Denny L. Reed, 113 S. Kalamath St., Denver, Colo.
Filed Dec. 15, 1958, Ser. No. 780,583
1 Claim. (Cl. 30—293)

The present invention relates to a tool for cutting leather thongs from scrap pieces of leather and, more particularly, to a thong cutter of the type shown and described herein.

Previously different types of apparatus have been designed and built so that leather thongs could be cut from flat sheets of leather or so that similar thongs could be cut from other materials.

It is an object of this invention to provide new and improved means for cutting leather thongs which may be built and operated economically.

Another object of this invention is to provide means whereby conventional cutting or razor blades may be used effectively to cut a thong of regulated width.

A further object of this invention is to provide a thong cutting apparatus which is adjustable to accommodate various thicknesses of material and to cut different widths of thong.

Other objects of this invention include the provision of means for cutting an initial central opening and further means provided for the storage of additional cutting blades.

Further objects and advantages of the present invention will be apparent from the appended description and drawings, in which—

Fig. 1 is a side elevation in partial broken section showing details of this invention, Fig. 2 is an elevation taken along the line 2—2 of Fig. 1, Fig. 3 is a perspective view showing a method of use for tools made in accordance with this invention, and Fig. 4 is a perspective view showing a further use of elements of this invention.

Briefly stated, the present invention provides a thong cutting device which comprises a support handle providing adjustable support for a slide member which is moved reciprocally to adjust to various thicknesses of material and a cutting blade holder which likewise moves reciprocally to effect adjustments in the width of the thong to be cut. In addition, the handle provides storage space for additional cutting blades as well as protection for the scribe device used to make an initial central opening in the material from which the thongs are to be cut.

The detailed features of the invention are more fully shown in the accompanying drawings, in which a support handle 11 is shown to be formed of plastics or other similar materials. This handle 11 provides guide support between the lower ledge surface 12 and the overhanging lip 13 for a reicprocally movable cutter blade holder 14. This blade holder 14 may be held in its adjusted reciprocal positions by tightening the adjusting screw 16 which extends through the slot 17 in the blade holder 14. As the slide 14 is moved reciprocally, the width of opening between the cutter blade 18 and the guide face 19 of the handle 11 will be adjusted. Since the notch 21 extends past the guide face 19 in position as shown, it is obvious that further forward extension of the blade holder 14 will accommodate greater widths of thong between the cutter blade 18 and guide face 19.

In order to determine the width of the thong to be cut, indexing means 22 is provided on the mating faces of the blade holder 14 and lip 13. These indexing markings may be used to preset the blade holder 14 to provide an exact desired width of cut.

In addition to providing for the reciprocal support of the blade holder 14, handle 11 further provides encompassing support for a thickness adjusting slide 23. This slide member 23 is likewise provided with a slot 24. Adjusting screw 26 extends through openings in the handle 11 and passes through the slot 24 so that the slide 23 may be moved reciprocally to adjusted positions. When in the position desired, tightening of the adjusting screw 26 will hold the slide in such adjusted position. The purpose of adjusting slide 23 is so that the effective opening of the slot adjacent the cutter blade 18 may be narrowed to accommodate the thickness of the leather or other material being cut.

When the width of this passage is correctly adjusted through movement of the slide 23, the material being cut is prevented from folding or wrinkling as the material moves past the guide face 19 and the cutter blade 18. Accordingly, a regulated width of thong may be cut from the material.

In addition to providing a thickness adjustment, the slide 23 is positioned within the slot 20 in the handle 11 to close off a pocket 25 cut in the handle 11 and behind the slide 23. This pocket, as shown, may be conveniently used for the storage of extra cutter blades 18. These extra cutting blades 18 held in the handle 11 may be removed for use when the cutting blade has been dulled. However, it should be noted that provision is made for utilizing nearly the full length of the cutting blade 18 before replacement is necessary. This feature is made possible through the use of a cut slot 27 on the inner face of the holder 14 which is of width slightly greater than the thickness of the cutting blade 18 but which is of length greater than the length of the cutting blade 18. Accordingly, the blade 18 may be moved reciprocally in such slot to adjusted positions.

Because of the economy of initial purchase and replacement, the slot 27 is adapted to receive commercially sold razor blades. When replaceable blades of this type are used, no special blade holding device is needed, since the depth of the slot 27 can be made just slightly less than the width of the blade 18. Accordingly, tightening of the adjusting screw 16 will cause the cutting edge of the blade 18 to move into contact with the surface of the handle 11 or of the adjusting slide 23. Slight contact between the blade cutting edge and the plastic of handle 11 is enough to keep the blade from moving, and whenever a used portion of the blade becomes dull, the blade can be repositioned to provide a still sharp cutting edge.

Since it is intended that this apparatus shall be used primarily to cut thongs from flat pieces of material, such as scrap leather, and further since the apparatus works best when cutting from the inside of such material outwardly, provision is made for cutting an initial central opening in such scrap material. This cutting function is accomplished through use of a pivot 28 and a cutter blade 29 which extend out of the top surface of the blade holder 14. These elements which are normally protected by the overhanging lip 13 of the handle 11 may be removed from handle 11 together with blade holder 14 to be used as shown in Fig. 4 to scribe and cut a central opening 31 in a piece of leather 32 or the like. After the central opening is cut and the blade holder 14 is repositioned on the handle 11, the tool may be used as shown in Fig. 3 to cut an initial tab of thong 33 from the scrap leather 32. Once the tab 33 has been cut, such tab may be pulled by the operator and thereafter and adjusted width of thong will be cut continuously and spirally outwardly from the central opening of the scrap piece 32.

Since long continued usage of the tool has a tendency to wear away the handle at the guide face 19, it is contemplated that an insert piece of metal 34, as shown in Fig. 1, may be used to provide a more durable guide face 19. This insert piece 34 may be either molded in handle 11 or be separately secured thereto by fastening means (not shown).

While a present embodiment of this invention is shown as a hand held and used tool, it is obvious that the features of this invention are adaptable to use in connection with other forms of mechanisms and machines. Accordingly, all such modifications as are suggested by this device and which come within the scope of the hereunto appended claim are deemed to be a part of this invention.

What is claimed is:

A thong cutting device comprising a support piece having a transverse channel providing a work opening, a blade holder mounted for reciprocal movement on said support piece and having a notch adapted for mating alignment with the transverse channel of said support piece, said blade holder further providing an elongated opening, a fastening member for engagement through said elongated opening for holding said blade holder in surface to surface engagement with said support piece, a narrow slot in said blade holder, and a cutter blade of lesser length than said slot adapted to be received in said slot, said cutter blade further having a width just slightly greater than the depth of said slot so the cutting edge thereof will be exposed above the surface of said blade holder for position holding engagement with the surface of said support piece when said fastening member is tightened, said arrangement providing for adjustment of the work opening through interaction of said fastening member and the elongated opening of said blade holder and for the presentation of a new cutting edge of said cutter blade by reciprocally moving said blade in the narrow slot of said blade holder.

References Cited in the file of this patent

UNITED STATES PATENTS

| | | |
|---|---|---|
| 1,315,128 | Jacquot | Sept. 2, 1919 |
| 2,411,927 | Luke | Dec. 3, 1946 |
| 2,518,991 | Kolodnicki | Aug. 15, 1950 |
| 2,559,291 | Engeln | July 3, 1951 |